United States Patent [19]
Bell

[11] Patent Number: 5,724,921
[45] Date of Patent: Mar. 10, 1998

[54] PET LEASH

[76] Inventor: Shari Bell, 3533 River Heights Crossing, Marietta, Ga. 30067

[21] Appl. No.: 684,419

[22] Filed: Jul. 19, 1996

[51] Int. Cl.$^6$ .................................................. A01K 27/00
[52] U.S. Cl. ................................................ 119/795
[58] Field of Search ............................ 119/769, 795, 119/792, 793, 796, 797, 798; 294/82.12

[56] References Cited

U.S. PATENT DOCUMENTS

| | | | |
|---|---|---|---|
| 2,776,644 | 1/1957 | Fontaine | 119/796 |
| 4,879,972 | 11/1989 | Crowe et al. | 119/795 |

*Primary Examiner*—Gene Mancene
*Assistant Examiner*—Thomas Price

[57] ABSTRACT

An improved pet leash (10) includes a single pulley system (12) having a pulley handle (12B) located on either distal end, the pulley system (12) being pivotally connected to an elastic cord (14) that is secured to a conventional lease (16). The pulley system (12) and the cord (14) cooperate to reduce or eliminate the pulling and jarring effects of a pet when engaged to a lease (16). Specifically, the improved pet leash (10) enables the user to run, jog or walk with a pet more effectively and efficiently by eliminating or reducing the ability of the pet to disrupt the exercise routine. The pulley system (12) is designed to allow the user a full range of arm motion while the elastic cord (14) absorbs the pulling and tugging effects of the pet. Pulley handle pads (12BA) on each pulley handle (12B) enable the user to maintain a firm grip of the pet while running or walking. A second improved pet leash (110) includes a single pulley system (12) removably attached to a retractable cord reel (114) having a retractable cord reel attachment device (114A) on one distal end. The retractable cord reel attachment device (114A) comprises a second leash (116) which is retractably wound with in the retractable cord reel (114). An exposed distal end of the second leash (116) is securely attached to a second leash quick release (116A). The retractable cord reel (114) functions to keep tension on the second leash (116).

8 Claims, 4 Drawing Sheets

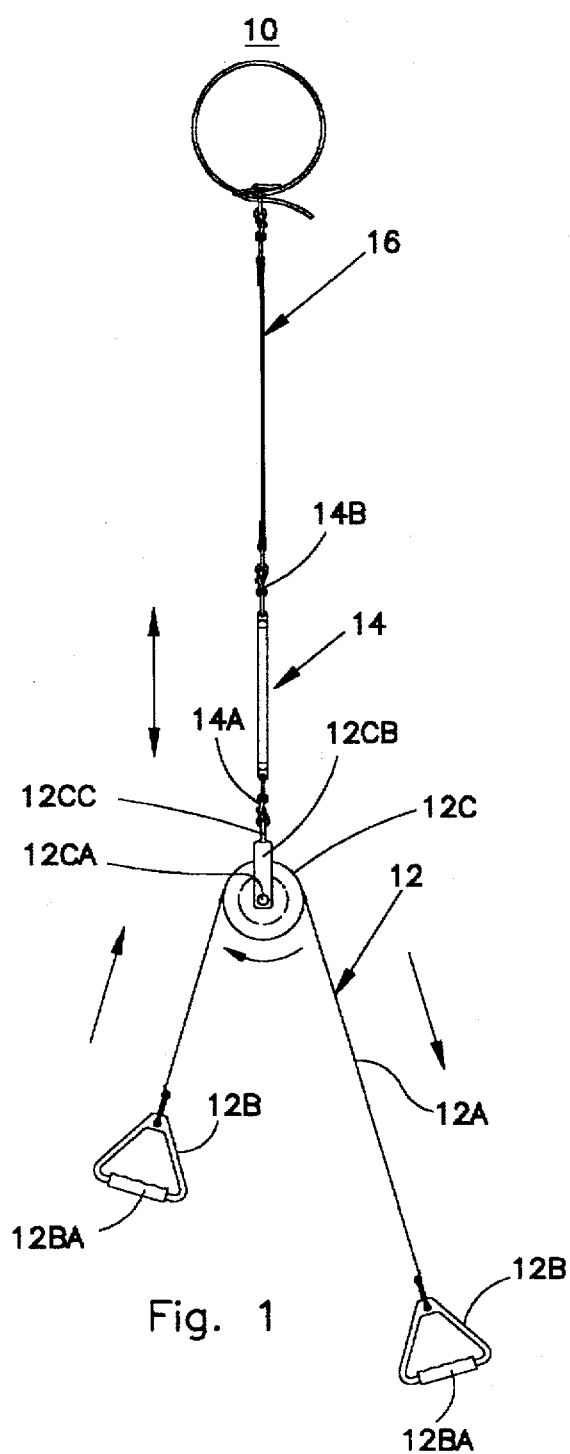
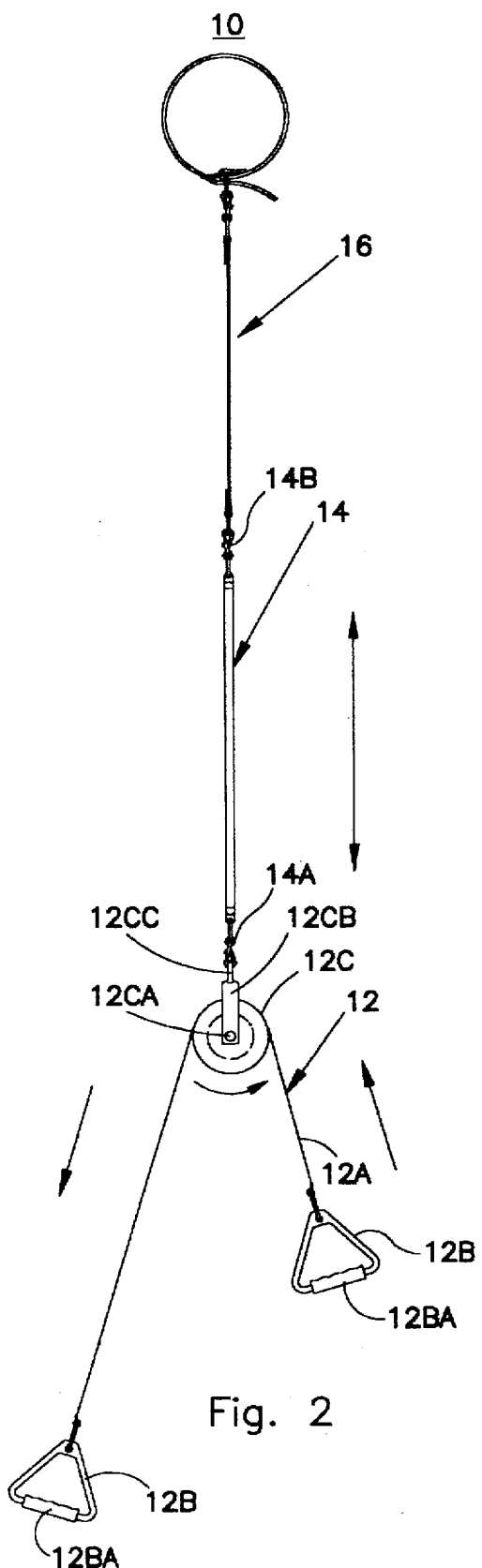

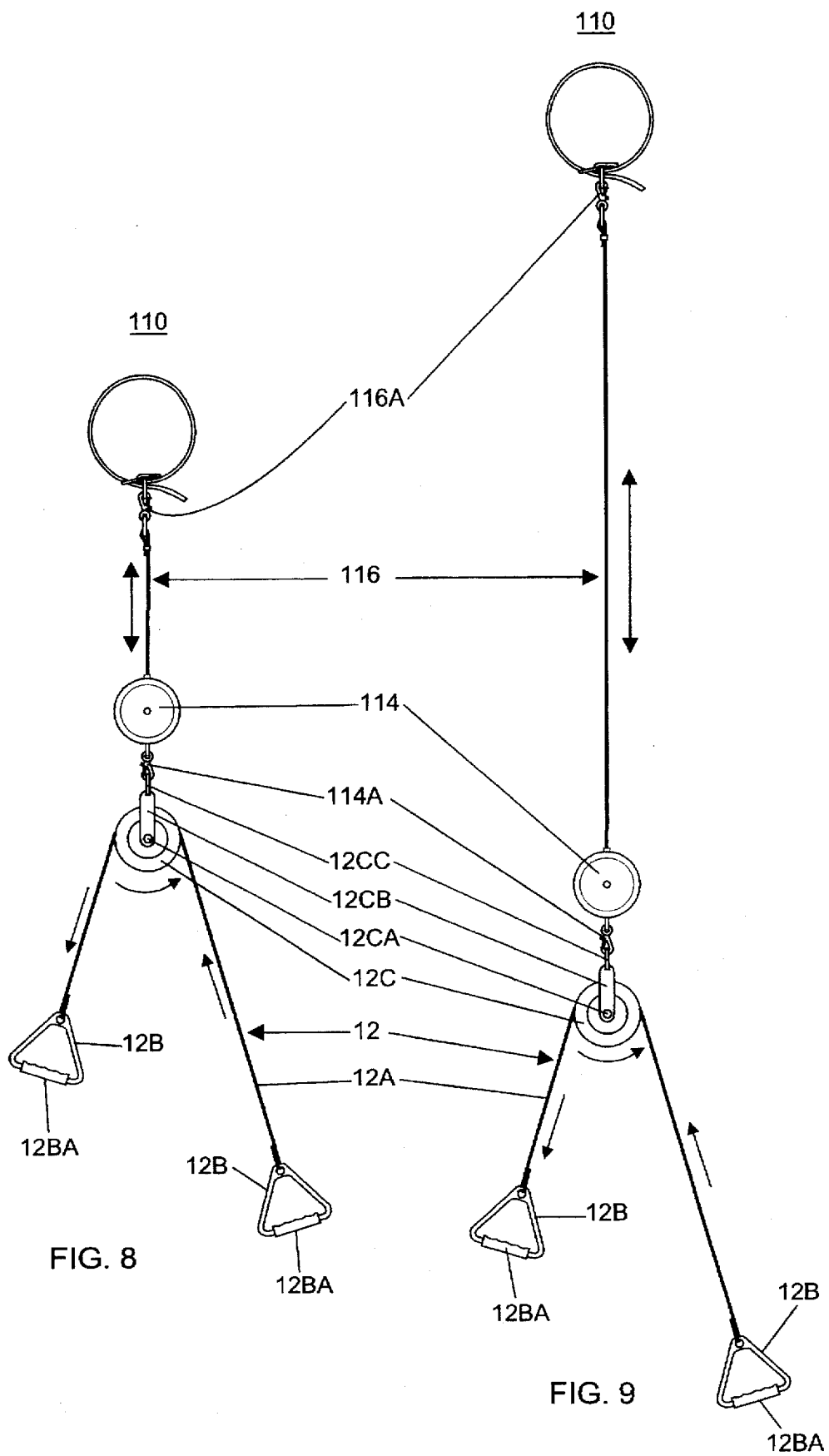

PET LEASH

BACKGROUND OF THE INVENTION

Field of the Invention

The present invention relates to an improved pet leash which reduces the stress and impact typically experienced by joggers who run with their pets. More specifically, the device utilizes a pulley system which cooperates with a flexible cord connected to a leash to allow the user a wide range of arm motion when exercising with their pets.

Description of the Prior Art

The decision to exercise with one's pet can result in a variety of problems for both the user and the pet. By way of example and not of limitation, such problems include becoming entangled with the leash, being unexpectedly jerked or jolted by the pet, losing a grip on the leash or being pulled from one side to the other. Such problem result from the fact that a leash is a single, rigid cord which is generally two or three feet long. Because most dries have enacted some form of leash law, owners are required to use a leash whenever they are with their pets in a public area. Although various improvements, discussed hereinafter, have been made to confront the above problems, there does not appear to be a device which allows the unfettered movement of hands and arms during the course of exercise.

Numerous innovations for an improved pet leash have been provided in the prior art that are described as follows. Even though these innovations may be suitable for the specific individual purposes to which they address, they differ from the present invention as hereinafter contrasted.

U.S. Pat. No. 4,488,511 to Grassano discloses a shock-absorbent leash for animals intended to absorb or reduce the shock experienced by a pet owner when the pet exerts a sudden, substantial pull. The device includes a pneumatic cylinder which utilizes a compressed spring and compressed air to reduce the shock encountered when an animal suddenly and forcible tugs on the leash. This patent differs from the present invention because a pulley system used in conjunction with a flexible cord is not disclosed. Moreover, the present invention requires the user to operate the device with both hands, whereas this patent requires the use of one hand.

U.S. Pat. No. 5,146,876 to McPhail discloses a shock absorber leash which comprises one elastic and one non-elastic member which cooperate with one another to absorb the shock typically experienced when an animal pulls away. This patent differs from the present invention because a pulley system to allow the arms a full range of motion during exercise is not disclosed.

U.S. Pat. No. 5,080,045 to Reese et at. reveals a pet leash for joggers which wraps around the waist of the user. U.S. Pat. No. 5,038,719 to McDonough provides a dog leash for runners which includes an elastic cord secured to a belt which is worn by the user. These patents differs from the present invention because the present invention contemplates the use of both hands in conjunction with a pulley system used in cooperation with an elastic cord to secure to a leash. This feature is not disclosed in the present patents.

U.S. Pat. No. 3,441,005 to Fink discloses an elastic cord intended to reduce the stress experienced when a pet pulls or tugs. This patent does not include a pulley system which is the embodiment of the present invention.

Numerous innovations for an improved pet leash have been provided in the prior art that are adapted to be used. Even though these innovations may be suitable for the specific individual purposes to which they address, they would not be suitable for the purposes of the present invention as heretofore described.

SUMMARY OF THE INVENTION

In accordance with the present invention, an improved pet leash comprises a single pulley system having a non-elastic cable with a pivotally mounted handle attached on either distal end. The pulley is connected to one end of an elastic cable, the opposite end of the cable is connected to a conventional lease which is secured around the neck of a particular pet. Each handle of the pulley system comprises a foam gripping means, contoured to conform to the user's fingers. When in use, the device enables the user to walk, jog or run with his or her pet without being tugged or jerked by the animal. Specifically, the pulley system and elastic cable cooperate with one another to enable the user's arms to move freely during exercise.

Accordingly, it is an object of the present invention to provide an improved pet leash which absorbs or reduces the shock associated with the pulling or tugging of a pet on a leash.

More particularly, it is an object of the present invention to provide an improved pet leash which allows the user to fully control his or her pet with minimal effort.

Another feature of the present invention is that the improved pet leash enables the user to employ both hands to control the pet.

Yet another feature of the present invention is that the device is manufactured from lightweight materials including plastic, plastic composite, rubber, rubber composite and nylon.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING 10-improved pet leash (10)
12-pulley system (12)
12A-pulley cable (12A)
12B-pulley handle (12B)
12BA-pulley handle pad (12BA)
12BB-pulley handle housing (12BB)
12C-pulley wheel (12C)
12CA-pulley wheel pin (12CA)
12CB-pulley wheel brace (12CB)
12CC-pulley wheel attachment means (12CC)
14-cord (14)
14A-cord first attachment means (14A)
14B-cord second attachment means (14B)
16-leash (16)

SECOND EMBODIMENT 110-second improved pet leash (110)
12-pulley system (12)

12A-pulley cable (12A)

12B-pulley handle (12B)

12BA-pulley handle pad (12BA)

12BB-pulley handle housing (12BB)

12C-pulley wheel (12C)

12CA-pulley wheel pin (12CA)

12CB-pulley wheel brace (12CB)

12CC-pulley wheel attachment means (12CC)

114-retractable cord reel (114)

114A-retractable cord reel attachment means (114A)

116-second leash (116)

116A-second leash quick release (116A)

BRIEF DESCRIPTION OF THE PREFERRED EMBODIMENT

FIG. 1 is a top view of the improved pet leash.

FIG. 2 is a top view of the improved pet leash with the elastic cord extended.

FIG. 8 is a top view of the second improved pet leash.

FIG. 9 is a top view of the second improved pet leash with a second leash extended.

DETAILED DESCRIPTION OF THE PREFERRED EMBODIMENT

Figure 3:
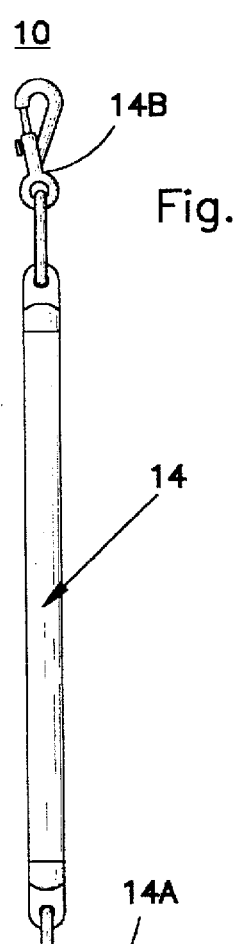
FIG. 3 is a top view of the elastic cord.

Firstly, referring to FIG. 1 which is a top view of the improved pet leash (10) exhibiting the following features: pulley system (12); pulley cable (12A); pulley handle (12B); pulley handle pad (12BA); pulley handle housing (12BB); pulley wheel (12C); pulley wheel pin (12CA); pulley wheel brace (12CB); pulley wheel attachment means (12CC); cord (14); cord first attachment means (14A); cord second attachment means (14B); and leash (16). The improved pet leash (10) comprises a single pulley system (12) having a pulley cable (12A) with a pulley handle (12B) pivotally secured on either distal end. Each pulley handle (12B) further comprises a pulley handle pad (12BA) which is preferably manufactured from foam rubber. The pulley handle pad (12BA) is contoured to fit the user's fingers, enabling the user to maintain a firm hold on the pulley handle (12B). The pulley cable (12) is secured through the pulley handle housing (12BB), allowing the pulley handles (12B) a wide range of motion. The pulley cable (12A) is displaced over a pulley wheel (12C) which is connected to a pulley wheel brace (12CB) by means of a pulley wheel pin (12CA) inserted therein. A pulley wheel attachment means (12CC), preferably having a ring-like configuration, connects the pulley system (12) to a cord (14) by interlocking a cord first attachment means (14A), also having a ring-like configuration, located on one distal end of the cord (14). The cord (14) is manufactured from an elastic material such as rubber, rubber composite and nylon or, alternatively, the cord (14) may also be a spring. The opposite distal end of the cord (14) comprises a cord second attachment means (14B), which secures the cord (14) to a conventional leash (16).

Now referring to FIG. 2 which is a top view of the improved pet leash (10) with the elastic cord (14) extended.

As stated hereinbefore, the improved pet leash (10) enables the user to engage in typical exercise routines with a pet without having said routines interrupted by the pet tugging or pulling the leash one way or the other. The elastic cord (14) absorbs the impact of a sudden tug or jerk and the pulley system (12) compensates for a spontaneous change of direction. Where the leashed pet might suddenly pull off to the immediate right or left, the pulley system (12) compensates for the change of direction, enabling the user to adjust accordingly.

Now referring to FIG. 3 which is a top view of the elastic cord (14) exhibiting the cord first attachment means (14A) and the cord second attachment means (14B).

Figure 4:
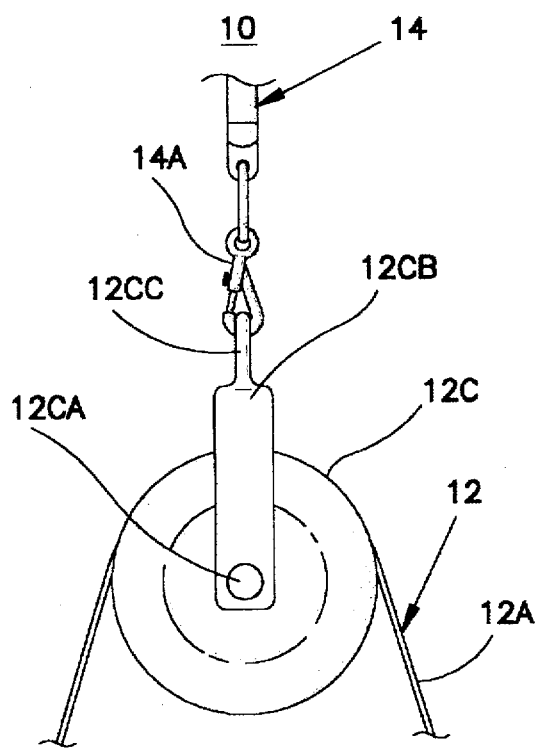
FIG. 4 is a top view of the pulley wheel.

Now referring to FIG. 4 which is a top view of the pulley wheel (12C) secured to the cord (14) by means of the pulley wheel attachment means (12CC) interlocking the cord first attachment means (14A).

Figure 5:
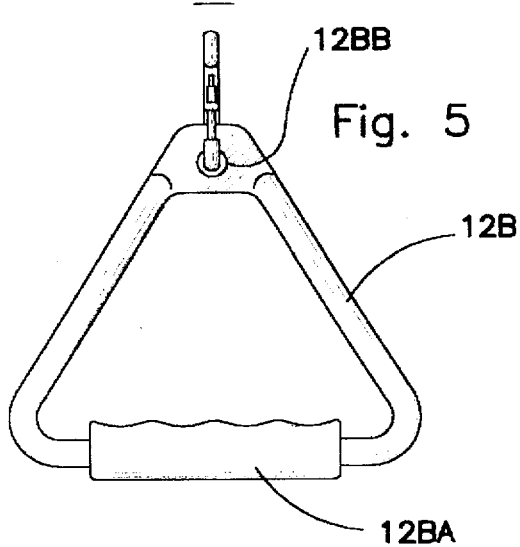
FIG. 5 is a top view of the pulley handle.

Now referring to FIG. 5 which is a top view of the pulley handle (12B) with the pulley handle pad (12BA) secured thereon. As stated hereinbefore, the contoured configuration of the pulley handle pad (12BA) enables the user to maintain a firm grip on the device when the same is in use.

Figures 6, 7:
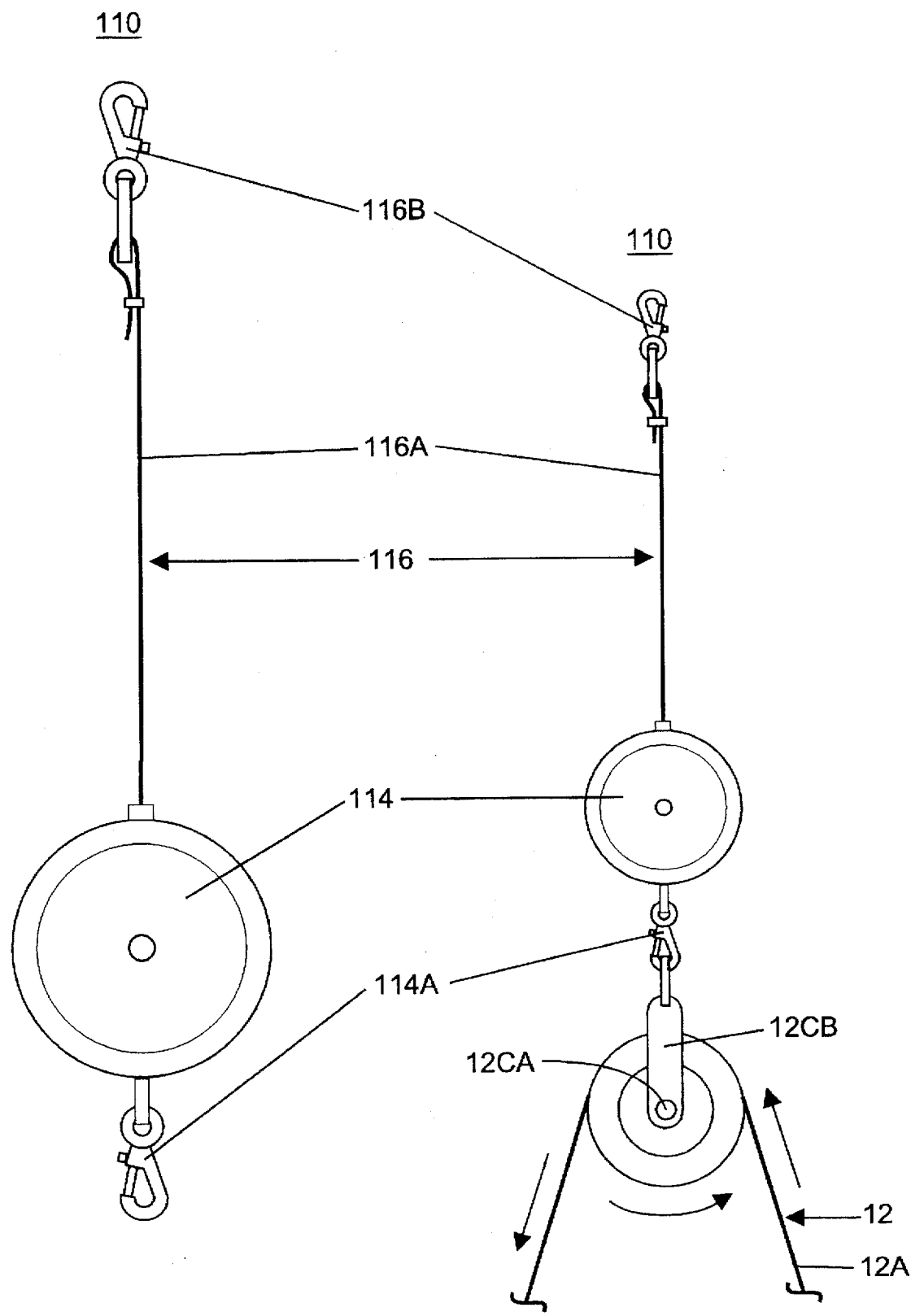
FIG. 6 is a top view of the retractable cord reel attached to the pulley system.
FIG. 7 is a top view of the retractable cord reel.

Now referring to FIG. 7 which is a top view of the retractable cord reel (114) exhibiting the retractable cord reel attachment means (114A).

Now referring to FIG. 6 which is a top view of the pulley wheel (12C) secured to the retractable cord reel (114) by means of the pulley wheel attachment means (12CC) interlocking the retractable cord reel attachment means (114A).

Firstly, referring to FIG. 8 which is a top view of a second improved pet leash (110) exhibiting the following features: pulley system (12); pulley cable (12A); pulley handle (12B); pulley handle pad (12BA); pulley handle housing (12BB); pulley wheel (12C); pulley wheel pin (12CA); pulley wheel brace (12CB); pulley wheel attachment means (12CC); retractable cord reel (114); retractable cord reel attachment means (114A); cord second attachment means (14B); and leash (16). The second improved pet leash (110) comprises a single pulley system (12) having a pulley cable (12A) with a pulley handle (12B) pivotally secured on either distal end. Each pulley handle (12B) further comprises a pulley handle pad (12BA) which is preferably manufactured from foam rubber. The pulley handle pad (12BA) is contoured to fit the user's fingers, enabling the user to maintain a firm hold on the pulley handle (12B). The pulley cable (12) is secured through the pulley handle housing (12BB), allowing the pulley handles (12B) a wide range of motion. The pulley cable (12A) is displaced over a pulley wheel (12C) which is connected to a pulley wheel brace (12CB) by means of a pulley wheel pin (12CA) inserted therein. A pulley wheel attachment means (12CC), preferably having a ring-like configuration, connects the pulley system (12) to a retractable cord reel (114) by interlocking a retractable cord reel attachment means (114A), also having a ring-like configuration, located on one distal end of the retractable cord reel (114). The retractable cord reel (114) is is well known in the art. The retractable cord reel (114) comprises a second leash (116) having one end securely attached therein. The opposite distal end is wound around a constant spring loaded reel which functions to keep the second leash (116) retracted within the retractable cord reel (114) until pulled. The retractable cord reel (114) functions to pay out and pay in a second leash (116) as required.

Now referring to FIG. 9 which is a top view of the second improved pet leash (110) with the retractable cord reel (114) extended. As stated hereinbefore, the improved pet leash

(10) enables the user to engage in typical exercise routines with a pet without having said routines interrupted by the pet tugging or pulling the leash one way or the other. The retractable cord reel (114) absorbs the impact of a sudden tug or jerk and the pulley system (12) compensates for a spontaneous change of direction. Where the leashed pet might suddenly pull off to the immediate right or left, the pulley system (12) compensates for the change of direction, enabling the user to adjust accordingly.

It will be understood that each of the elements described above, or two or more together, may also find a useful application in other types of constructions differing from the type described above.

While the invention has been illustrated and described as embodied in an improved pet leash, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An improved pet leash (10) comprising:
   a) a pulley system (12) which comprises a pulley cable (12A) slidably engaged over a pulley wheel (12C) and secured thereon by means of a pulley wheel brace (12CB) which is connected to the pulley wheel (12C) by means of a pulley wheel pin (12CA) inserted there through, either distal end of the pulley cable (12A) is insertable through a pulley handle housing (12BB) which is integrally connected to a pulley handle (12B), the pulley handle (12B) further has an overlapping pulley handle pad (12BA); and
   b) an elastic cord (14) having a cord first attachment means (14A) on one distal end, the cord first attachment means (14A) interlocks a pulley wheel attachment means (12CC) movably secured to the pulley wheel (12CC), a cord second attachment means (14B) located on the opposite distal end of the cord (14) connects the cord (14) to a conventional leash (16).

2. The improved pet leash (10) as described in claim 1, wherein the cord (14) is manufactured from a material selected from the group consisting of plastic, plastic composite, rubber, rubber composite and nylon.

3. The improved pet leash (10) as described in claim 1, wherein the pulley handle pad (12BA) is manufactured from a material selected from the group consisting of rubber, foam rubber, rubber composite and sponge.

4. The improved pet leash (10) as described in claim 1, wherein the pulley handle pad (12BA) is ergonomically contoured to conform to the fingers of the hand.

5. A second improved pet leash (110) comprising:
   a) a pulley system (12) which comprises a pulley cable (12A) slidably engaged over a pulley wheel (12C) and secured thereon by means of a pulley wheel brace (12CB) which is connected to the pulley wheel (12C) by means of a pulley wheel pin (12CA) inserted therethrough, either distal end of the pulley cable (12A) is insertable through a pulley handle housing (12BB) which is integrally connected to a pulley handle (12B), the pulley handle (12B) further has an overlapping pulley handle pad (12BA); and
   b) a retractable cord reel (114) having a retractable cord reel attachment means (114A) on one distal end, the retractable cord reel attachment means (114A) interlocks a pulley wheel attachment means (12CC) movably secured to the pulley wheel (12CC), a second leash (116) is retractably wound within the retractable cord reel (114), an exposed distal end of the second leash (116) is securely attached to a second leash quick release (116A), the retractable cord reel (114) functions to keep tension on the second leash (116).

6. The second improved pet leash (110) as described in claim 5, wherein the second leash (116) is manufactured from a material selected from the group consisting of plastic, plastic composite, rubber, and rubber composite.

7. The second improved pet leash (110) as described in claim 5, wherein the pulley handle pad (12BA) is manufactured from a material selected from the group consisting of rubber, foam rubber, rubber composite and sponge.

8. The second improved pet leash (110) as described in claim 5, wherein the pulley handle pad (12BA) is ergonomically contoured to conform to the fingers of a user's hand.

* * * * *